United States Patent
Burr et al.

(10) Patent No.: US 7,384,068 B2
(45) Date of Patent: Jun. 10, 2008

(54) SNAP IN TILT BUMPER

(75) Inventors: Larry W. Burr, Saginaw, MI (US); Carl T. Seamon, New Lothrop, MI (US)

(73) Assignee: Delphi Technologies, Inc., Troy, MI (US)

( * ) Notice: Subject to any disclaimer, the term of this patent is extended or adjusted under 35 U.S.C. 154(b) by 297 days.

(21) Appl. No.: 11/003,070

(22) Filed: Dec. 3, 2004

(65) Prior Publication Data

US 2006/0119090 A1 Jun. 8, 2006

(51) Int. Cl.
*B62D 1/18* (2006.01)
(52) U.S. Cl. .......................... 280/775; 74/493
(58) Field of Classification Search ............... 280/775; 74/493
See application file for complete search history.

(56) References Cited

U.S. PATENT DOCUMENTS

| | | | | |
|---|---|---|---|---|
| 4,612,822 A | * | 9/1986 | Nishikawa et al. ........... 74/493 |
| 4,739,673 A | * | 4/1988 | Ishikawa et al. ............ 74/493 |
| 5,226,853 A | * | 7/1993 | Courgeon ................... 464/160 |
| 5,626,363 A | * | 5/1997 | Rispeter .................... 280/775 |
| 7,011,340 B2 | * | 3/2006 | Tsuji et al. ................. 280/775 |
| 2003/0172765 A1 | * | 9/2003 | Heiml ......................... 74/493 |
| 2004/0104565 A1 | * | 6/2004 | Tsuji et al. ................. 280/775 |
| 2006/0186658 A1 | * | 8/2006 | Yasuhara et al. .......... 280/775 |

* cited by examiner

*Primary Examiner*—Ruth Ilan
*Assistant Examiner*—Leonard McCreary, Jr.
(74) *Attorney, Agent, or Firm*—Michael D. Smith

(57) ABSTRACT

A first steering column member and a second steering column member are engaged for pivoting movement, and include confronting surfaces that limit the relative movement of the members. A bumper is disposed between the confronting surfaces to absorb impact during the adjusting movement. The bumper is fixedly connected to one of the first and second steering column members in a snap-fit connection.

19 Claims, 4 Drawing Sheets

SNAP IN TILT BUMPER

FIELD OF THE INVENTION

The invention relates to a steering column of a vehicle and more particularly to shock absorbing bumper positionable between two steering column members moveable relative to one another.

BACKGROUND OF THE INVENTION

Steering columns are often adjustable in telescope or in tilt/rake. Such steering columns include first and second steering column members moveable relative to one another over a path of adjusting movement. The end limits of the path of adjusting movement are often defined by corresponding confronting surfaces of each of the first and second steering column members. In other words, movement along the path of adjusting movement stops when the confronting surfaces contact one another. It can be desirable to position a cushion or bumper between the confronting surfaces to reduce the likelihood of noise and/or vibration when the confronting surfaces contact one another.

SUMMARY OF THE INVENTION AND ADVANTAGES

The invention provides an apparatus having a first steering column member with a first confronting surface. The apparatus also includes a second steering column member engaged with the first steering column member for one of pivoting and telescoping movement. The first and second steering column members can be engaged for both telescoping and tilting adjusting movement. The second steering column member includes a second confronting surface engageable with the first confronting surface. The first and second confronting surfaces cooperate with one another to limit the relative movement between the first and second steering column members. The apparatus also includes a bumper disposed between the first and second confronting surfaces to absorb impact of the first and second confronting surfaces substantially contacting one another during the adjusting movement. The bumper is fixedly connected to one of the first and second steering column members in a snap-fit connection.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
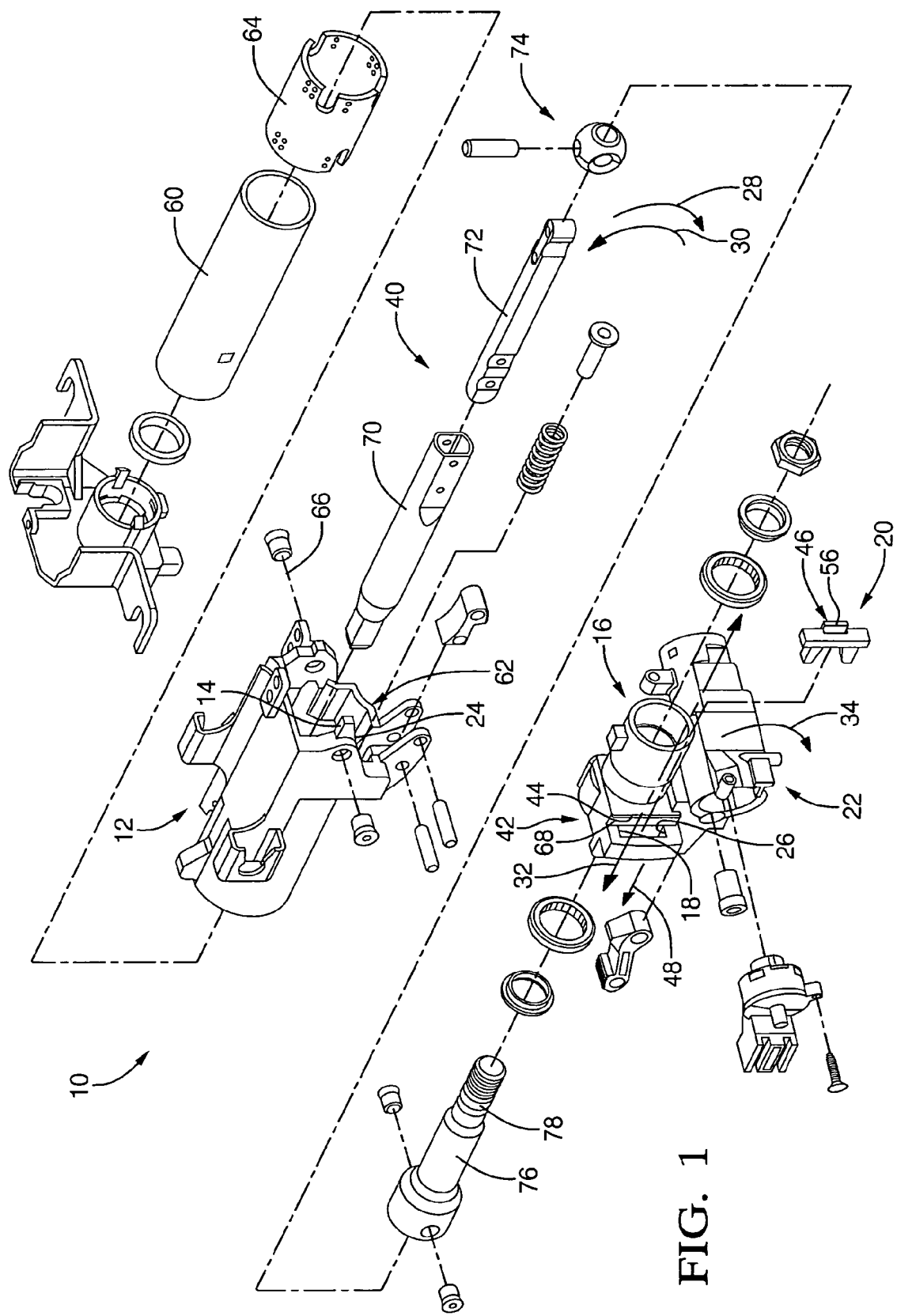
FIG. 1 is an exploded view of a steering column including a bumper according to a first embodiment of the invention.

A plurality of different embodiments of the invention are shown in the Figures of the application. Similar features are shown in the various embodiments of the invention. Similar features have been numbered with a common two-digit reference numeral and have been differentiated by a third digit placed before the two common digits. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring now to FIG. 1, in a first exemplary embodiment of the invention, an apparatus 10 includes a first steering column member 12 with a first confronting surface 14. The first steering column member 12 is an upper jacket engageable with a lower steering column jacket 60 for movement along a telescoping path of adjustment. The first confronting surface 14 is defined on a projection 62. A ball retaining sleeve 64 is disposed between the first steering column member 12 and the lower steering column jacket 60 and can include structure for absorbing energy associated with relative movement between the first steering column member 12 and the lower steering column jacket 60.

The apparatus 10 also includes a second steering column member 16 engaged with the first steering column member 12 for one of pivoting and telescoping movement. The first and second steering column members 12, 16 can be engaged for both telescoping and tilting adjusting movement. In the first exemplary embodiment of the invention, the first and second steering column members 12, 16 are engaged for tilting adjusting movement about an axis 66. The second steering column member 16 includes a second confronting surface 18 engageable with the first confronting surface 14. The first and second confronting surfaces 14, 18 cooperate with one another to limit the relative movement between the first and second steering column members 12, 16. For example, the first and second confronting surfaces 14, 18 substantially contact one another to define a limit of travel along the path of adjusting movement when the second steering column member 16 is moving in a first direction 28 about the axis 66 relative to the first steering column members 12.

The apparatus 10 also includes a bumper 20 disposed between the first and second confronting surfaces 14, 18 to absorb impact of the first and second confronting surfaces 14, 18 substantially contacting one another during the adjusting movement. The first and second confronting surfaces 14, 18 substantially contact one another in that the bumper 20 is pressed between the first and second confronting surfaces 14, 18, preventing the first and second confronting surfaces 14, 18 from actually contacting one another. The bumper 20 is fixedly connected to one of the first and second steering column members 12, 16 in a snap-fit connection 22. In the first exemplary embodiment, the bumper 20 is fixedly connected to the second steering column member 16.

The first steering column member 12 includes a third confronting surface 24. The second steering column member 16 includes a fourth confronting surface 26. The bumper 20 is disposed between the third and fourth confronting surfaces 24, 26 to absorb impact of the third and fourth confronting surfaces 24, 26 substantially contacting one another during pivoting movement. For example, the third and fourth confronting surfaces 24, 26 substantially contact one another to define a limit of travel along the path of adjusting movement when the second steering column member 16 is moving in a second direction 30, opposite of the first direction 28, about the axis 66 relative to the first steering column members 12.

The snap-fit connection 22 limits movement of the bumper 20 with respect to the second steering column member 16 along a connection axis 32. During engagement or activation of the snap-fit connection 22, one of the bumper 20 and second steering column member 16 is moved along the connection axis relative to the other. In the first exemplary embodiment of the invention, the second steering column member 16 includes an aperture 42 defining the second and fourth confronting surfaces 18, 26. The second steering column member 16 also includes an integrally-formed first connecting portion 44. The first connecting portion 44 is spaced from the second and fourth confronting surfaces 16, 26. In the first exemplary embodiment of the invention, the first connecting portion 44 is formed as a ledge or projection that extends away from an adjacent flat surface 68. The bumper 20 includes a body 54 positionable in the aperture 42. The bumper 20 also includes a second connecting portion 46. In the first exemplary embodiment of the invention, the second connecting portion 46 is formed as a finger 56 extending less than ninety degrees from the body 54. The finger 56 is bent or deformed around the first connecting portion 44 as the body 54 moves in a third direction 48 along a connection axis 32 to be received in the aperture 42. The finger 56 clears the first connecting portion 44 when the body 54 is fully received in the aperture 42 and partially returns to a pre-deformation condition. The finger 56 and the first connecting portion 44 cooperate to prevent the body 54 of bumper 20 from backing out of the aperture 42, or moving in a fourth direction along the connection axis 32 opposite of the third direction 48. The first and third confronting surfaces 14, 18 are disposed in the aperture 142 when the apparatus is fully assembled.

The finger 56 partially returns to a pre-deformation condition after clearing the first connecting portion 44. As a result, the finger 56 biases the bumper 20 in a first angular direction 34 relative to the aperture 42. This biasing portion 58 reduces the likelihood that the bumper 20 will rattle or move after the snap-fit connection 22 is engaged. In the first exemplary embodiment, the biasing portion 58 and the second connecting portion 46 are integral.

A rotatable shaft assembly 40 disposed internally with respect to the first and second steering column members 12, 16. The snap-fit connection 22 is disposed externally with respect to the first and second steering column members 12, 16. The shaft assembly 40 is a portion of a vehicle steering system and includes a tubular shaft 70, a lower shaft 72, a cardan joint 74, a second tubular shaft 76, and an upper shaft 78. The upper shaft 78 is connectable to a vehicle steering wheel.

Figure 2:
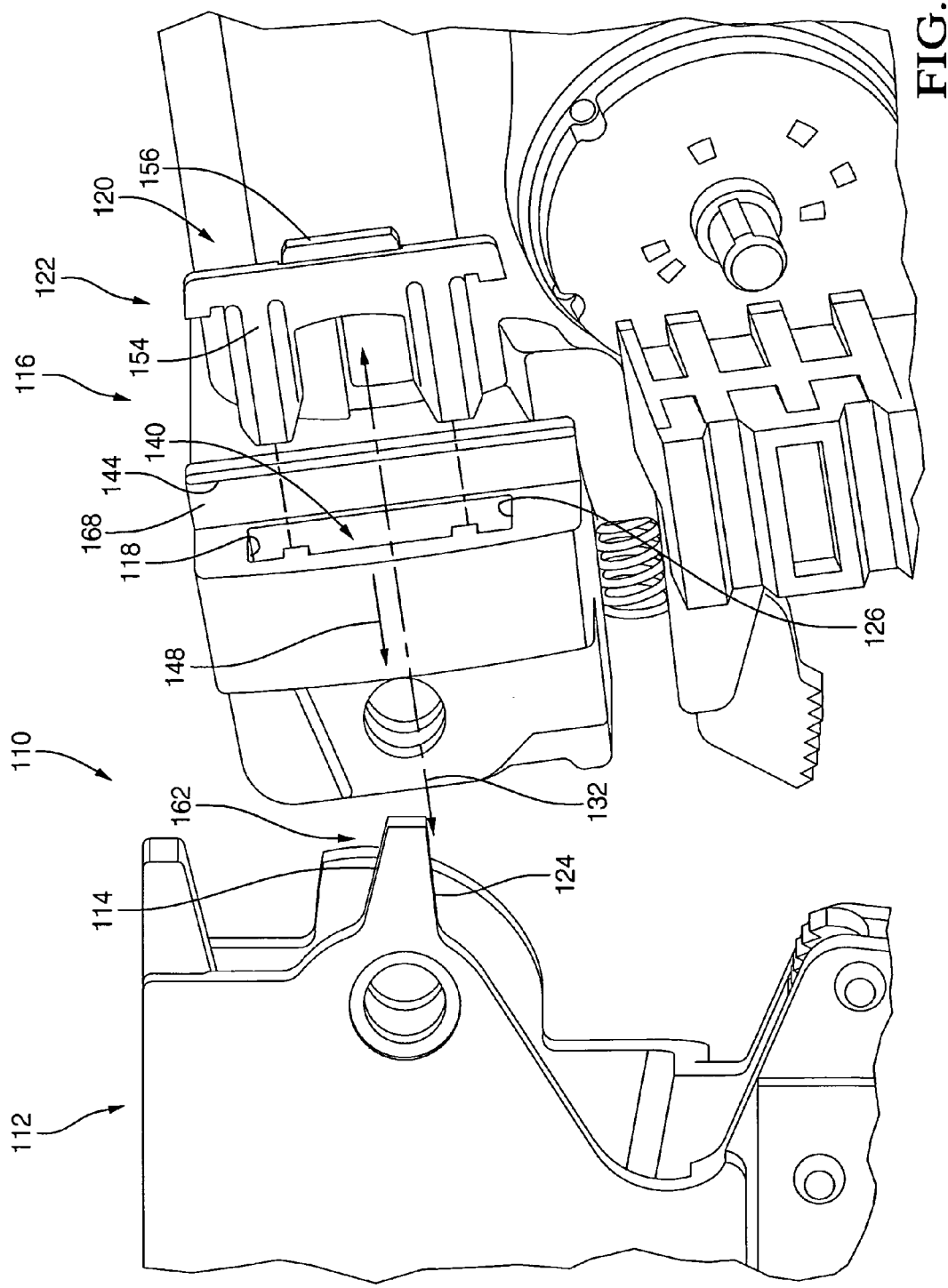
FIG. 2 is a side view of first and second steering column members of the steering column and a second exemplary bumper coming into engagement with one another.
Figure 3:
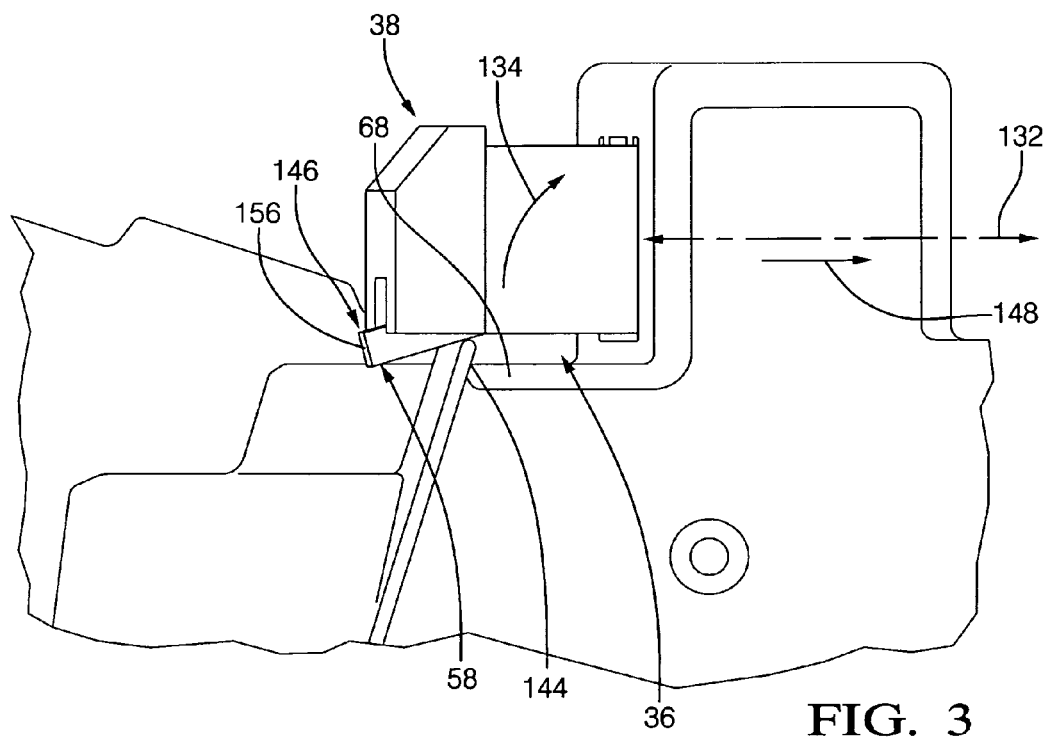
FIG. 3 is a top view of the second steering column member and the second exemplary bumper coming into engagement with one another.
Figure 4:
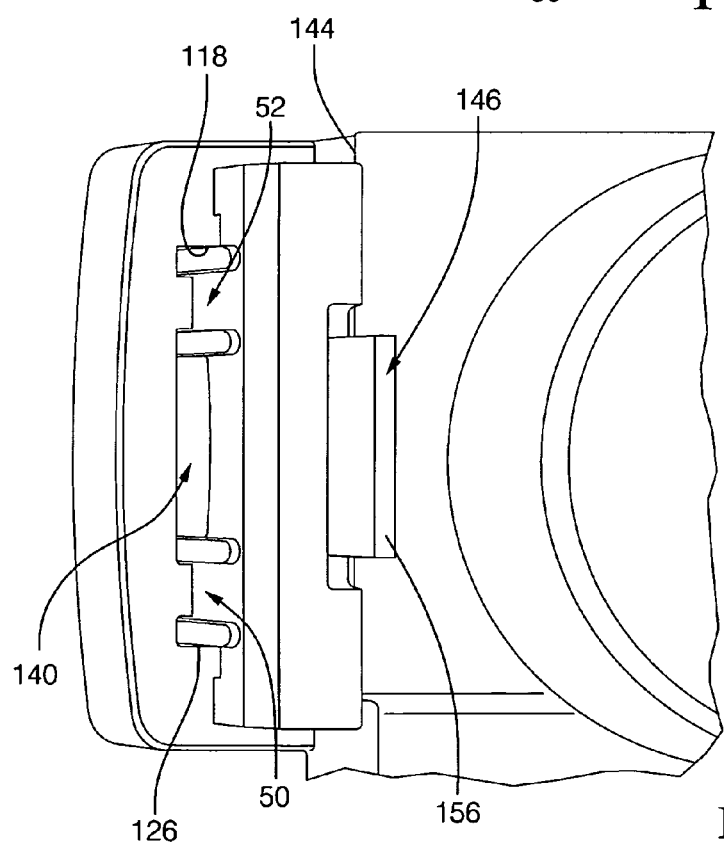
FIG. 4 is a perspective view of the second steering column member and the second exemplary bumper coming into engagement with one another.

Referring now to FIGS. 2-4, in a second exemplary embodiment of the invention, an apparatus 110 includes a first steering column member 112 with a first confronting surface 114. The first steering column member 12 is an upper jacket engageable with a lower steering column jacket, such as the lower steering column jacket 60, for movement along a telescoping path of adjustment. The first confronting surface 114 is defined on a projection 162.

The apparatus 110 also includes a second steering column member 116 engaged with the first steering column member 112 for one of pivoting and telescoping movement. The first and second steering column members 112, 116 can be engaged for both telescoping and tilting adjusting movement. In the second exemplary embodiment of the invention, the first and second steering column members 112, 116 are engaged for tilting adjusting movement about an axis, such as axis 66. The second steering column member 116 includes a second confronting surface 118 engageable with the first confronting surface 114. The first and second confronting surfaces 114, 118 cooperate with one another to limit the relative movement between the first and second steering column members 112, 116.

The apparatus 110 also includes a bumper 120 disposed between the first and second confronting surfaces 114, 118 to absorb impact of the first and second confronting surfaces 114, 118 substantially contacting one another during the adjusting movement. The first and second confronting surfaces 114, 118 substantially contact one another in that the bumper 120 is pressed between the first and second confronting surfaces 114, 118, preventing the first and second confronting surfaces 114, 118 from actually contacting one another. The bumper 120 is fixedly connected to one of the first and second steering column members 112, 116 in a snap-fit connection 122. In the first exemplary embodiment, the bumper 120 is fixedly connected to the second steering column member 116.

The first steering column member 112 includes a third confronting surface 124. The second steering column member 116 includes a fourth confronting surface 126. The bumper 120 is disposed between the third and fourth confronting surfaces 124, 126 to absorb impact of the third and fourth confronting surfaces 124, 126 substantially contacting one another during pivoting movement. For example, the third and fourth confronting surfaces 124, 126 substantially contact one another to define a limit of travel along the path of adjusting movement when the second steering column member 116 is moving in a second direction, opposite of the first direction, about the axis relative to the first steering column members 112.

The snap-fit connection 122 limits movement of the bumper 120 with respect to the second steering column member 116 along a connection axis 132. During engagement or activation of the snap-fit connection 122, one of the bumper 120 and second steering column member 116 is moved along the connection axis relative to the other. In the second exemplary embodiment of the invention, the second steering column member 116 includes an aperture 142 defining the second and fourth confronting surfaces 118, 126. The second steering column member 116 also includes an integrally-formed first connecting portion 144. In the second exemplary embodiment of the invention, the first connecting portion 144 is formed as a ledge or projection that extends away from an adjacent flat surface 168. The bumper 120 includes a body 154 positionable in the aperture 142. The bumper 120 also includes a second connecting portion 146. In the second exemplary embodiment of the invention, the second connecting portion 146 is formed as a finger 156 extending less than ninety degrees from the body 154. The finger 156 is bent or deformed around the first connecting portion 144 as the body 154 is moved in a third direction 148 along a connection axis 132 to be received in the aperture 142. The finger 156 clears the first connecting portion 144 when the body 154 is fully received in the aperture 142 and partially returns to a pre-deformation condition. The finger 156 and the first connecting portion 144 cooperate to prevent the body 154 of bumper 120 from backing out of the aperture 142, or, in other words, from moving in a fourth direction along the connection axis 132 opposite the third direction 148. The first and third confronting surfaces 114, 118 are disposed in the aperture 142 when the apparatus 110 is fully assembled.

The finger 156 partially returns to a pre-deformation condition after clearing the first connecting portion 144. As a result, the finger 156 biases the bumper 120 in a first angular direction 134 relative to the aperture 142. This biasing portion 158 reduces the likelihood that the bumper 120 will rattle or move after the snap-fit connection 122 is engaged. In the first exemplary embodiment, the biasing portion 158 and the second connecting portion 146 are integral.

The second steering column member 116 includes a first aligning portion 50 and the bumper 120 includes a second aligning portion 52. As best shown in FIG. 4, the first aligning portion 50 is a tongue and the second aligning portion 52 is a groove. The first and second aligning portions 50, 52 cooperate to guide movement of the second steering column member 116 and the bumper 120 with respect to one another during engagement of the second steering column member 116 and the bumper 120 in the snap-fit connection 122.

Figure 5:
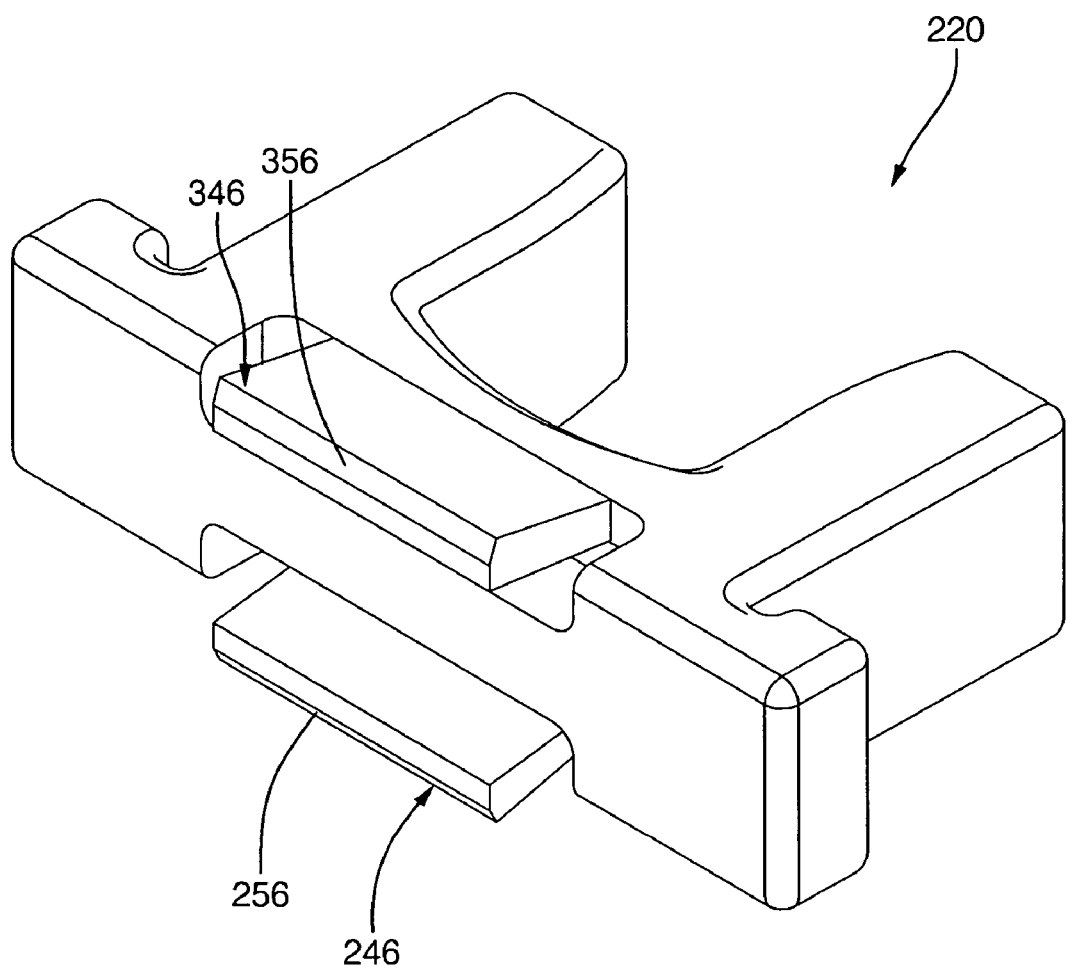
FIG. 5 is a perspective view of a third exemplary embodiment of the bumper.

The bumper 120 includes a longitudinal axis, which is aligned with the connection axis 132 in the FIGS. 2-4, and the bumper 120 is asymmetrical about the longitudinal axis. As a result, the snap-fit connection 122 is asymmetrical. In other words, the snap-fit connection 122 engages only one longitudinal side 36 the bumper 20, rather than both sides 36, 38. FIG. 5 shows another exemplary embodiment of a bumper 220 that is symmetrical about the longitudinal axis. The bumper 220 includes two connecting portions 246, 346, having fingers 256, 356, respectively.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
    a first steering column member having a first confronting surface;
    a second steering column member engaged with said first steering column member for pivoting movement and having second confronting surface engageable with said first confronting surface to limit said pivoting movement;
    a bumper disposed between said first and second confronting surfaces to absorb impact of said first and second confronting surfaces substantially contacting one another during said pivoting movement, said bumper fixedly connected to one of said first and second steering column in a snap-fit connection;
    a third confronting surface defined by said first steering column member; and
    a fourth confronting surface defined by said second steering column member wherein said bumper is disposed between said third and fourth confronting surfaces to absorb impact of said third and fourth confronting surfaces substantially contacting one another during said pivoting movement, wherein said first and second confronting surfaces substantially contact one another to limit said pivoting movement in a first direction and said third and fourth confronting surfaces substantially contact one another to limit said pivoting movement in a second direction opposite of said first direction.

2. The apparatus of claim 1 wherein said snap-fit connection limits movement of said bumper with respect to said one of said first and second steering column members along a connection axis and biases said bumper in a first angular direction.

3. The apparatus of claim 1 wherein said snap-fit connection is asymmetrical.

4. The apparatus of claim 3 wherein said snap-fit connection is further defined as engaging only one longitudinal side of said bumper.

5. The apparatus of claim 1 wherein said bumper includes a longitudinal axis and said bumper being symmetrical about said longitudinal axis.

6. The apparatus of claim 1 further comprising:
    a rotatable shaft assembly disposed internally with respect to said first and second steering column members, wherein said snap-fit connection being disposed externally with respect to said first and second steering column member.

7. The apparatus of claim 1 wherein said second confronting surface is defined in an aperture and said bumper being disposed in said aperture.

8. The apparatus of claim 7 wherein said first confronting surface is disposed in said aperture.

9. An apparatus comprising:
    a first steering column member having a first confronting surface;
    a second steering column member engaged with said first steering column member for pivoting movement and having second confronting surface engageable with said first confronting surface to limit said pivoting movement and also having an integrally-formed first connecting portion;
    a bumper disposed between said first and second confronting surfaces to absorb impact of said first and second confronting surfaces substantially contacting one another during said pivoting movement, said bumper fixedly connected to one of said first and second steering column members in a snap-fit connection and having an integrally-formed second connecting portion wherein said first and second connecting portions cooperate to define said snap-fit connection;
    a third confronting surface defined by said first steering column; and
    a fourth confronting surface defined by said second steering column member, wherein said bumper is disposed between said third and fourth confronting surfaces to absorb impact of said third and fourth confronting surfaces substantially contacting one another during said pivoting movement, wherein said first and second confronting surfaces substantially contact one another to limit said pivoting movement in a first direction and said third and fourth confronting surfaces substantially contact one another to limit said pivoting movement in a second direction opposite of said first direction.

10. The apparatus of claim 9 wherein said first connecting portion is rigid and said second connecting portion is deformable.

11. The apparatus of claim 9 wherein said bumper and said one of said first and second steering column members move relative to one another in a third direction along a connection axis to engage said snap-fit connection, wherein said snap-fit connection prevents movement along said connection axis in a fourth direction opposite of said third direction.

12. The apparatus of claim 9 wherein said second steering column member includes a first aligning portion and said bumper includes a second aligning portion wherein said first and second aligning portions cooperate to guide movement of said second steering column member and said bumper with respect to one another during engagement of said second steering column member and said bumper in said snap-fit connection.

13. The apparatus of claim 12 wherein said bumper includes a longitudinal axis and said bumper being asymmetrical about said longitudinal axis.

14. The apparatus of claim 9 wherein said bumper includes a body and said second connecting portion includes at least one finger extending less than ninety degrees from said body.

15. The apparatus of claim 14 wherein said at least one finger is deformed during engagement of said snap-fit connection and is less than fully recovered after said snap-fit connection is engaged.

16. An apparatus comprising:
a first steering column member having a first and third confronting surfaces;
a second steering column member engaged with said first steering column member for pivoting movement and having an aperture defining second and fourth confronting surfaces engageable with said first and third confronting surfaces, respectively, to limit said pivoting movement, wherein said first and second confronting surfaces substantially contact one another to limit said pivoting movement in a first direction and said third and fourth confronting surfaces substantially contact one another to limit said pivoting movement in a second direction opposite of said first direction, said second steering column member also having an integrally-formed first connecting portion spaced from said second and fourth confronting surfaces; and
a bumper disposed in said aperture between said first and second confronting surfaces and said third and fourth confronting surfaces to absorb impact of said first and second confronting surfaces substantially contacting one another during said pivoting movement in said first direction and to absorb impact of said third and fourth confronting surfaces substantially contacting one another during said pivoting movement in said second direction, said bumper fixedly connected to said second steering column member in a snap-fit connection and having an integrally-formed second connecting portion wherein said first and second connecting portions cooperate to define said snap-fit connection.

17. The apparatus of claim 16 wherein said bumper further comprises:
a body disposed in said aperture; and
a biasing portion urging said body in a first angular direction relative to said aperture.

18. The apparatus of claim 17 wherein said biasing portion and said second connecting portion are integral.

19. The apparatus of claim 18 wherein said second connecting portion includes at least one finger extending acutely from said body.

* * * * *